May 20, 1969  M. H. ALEXANDER ET AL  3,445,146
DEFLECTION LIMITED BEARING
Filed March 31, 1967
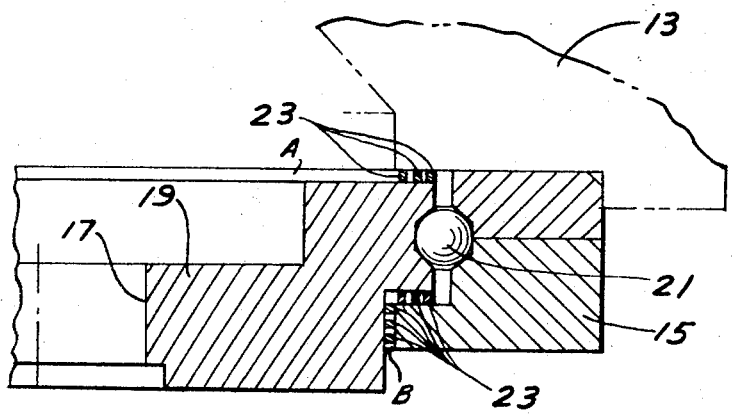
BERNARD J. MERRITT
MAX H. ALEXANDER
INVENTORS
BY H. M. Saragovitz
E. J. Kelly & H. Bert
ATTORNEYS
J. B. McGuire AGENT 3,445,146
DEFLECTION LIMITED BEARING
Max H. Alexander and Bernard J. Merritt, Bloomfield Hills, Mich., assignors to the United States of America as represented by the Secretary of the Army
Filed Mar. 31, 1967, Ser. No. 628,236
Int. Cl. F16c 17/00, 19/50, 21/00
U.S. Cl. 308—35                                     5 Claims

ABSTRACT OF THE DISCLOSURE

A bearing having compressible rolling members with a non-adhesive, frictionless, incompressible sealing material between bearing races, whereby upon overload, the rolling members are compressed and the bearing races continue to rotate relative to one another in sliding, rather than rolling, relationship.

---

The invention described herein may be manufactured and used by or for the Government of the United States of America for governmental purposes without the payment of any royalty thereon or therefor.

In common ball or roller type friction bearings, one of the most common problems encountered is that of brinelling. When a shock load is placed upon a bearing, which momentarily exceeds the limits of the rolling members of the bearing, the balls or rollers of the bearing tend to act in much the same manner as the spheres used in determining Brinell hardness numbers of materials. That is, they produce indentations in either or both of the bearing races—in effect destroying the bearing. In order to minimize the brinelling effect, in present bearing races, the bearings must be designed and manufactured with very close tolerances, a very expensive and often ineffective procedure especially in large diameter bearings. It is possible to eliminate brinelling completely only by keeping the value of the applied load at a lower force level than the elastic limits of the surface of the load carrying members. It is therefore an object of the present invention to provide a new and approved bearing in which brinelling cannot occur.

It is also an object of the present invention to provide a bearing which is inexpensive to manufacture.

It is a further object of the invention to provide a bearing in which all members may be manufactured to within much lower tolerances than has previously been possible.

Additionally, it is an object of the invention to provide a bearing in which the ball or roller members are elastic materials and in which the limitation of the deflection in the bearing is limited by the gap between the races so that the brinelling may not occur in the raceways.

It is also an object of the invention to provide a bearing which although normally a rolling bearing becomes a sliding bearing upon application of an overload force.

Other objects of the invention will become obvious to those skilled in the art upon reading the following description of a preferred embodiment of the invention, which is furnished for illustration and not for limitation of the invention.

In the drawing:

The drawing shows a potrion of a deflection limiting bearing, partly in section, embodying the present invention. More specifically, the drawing shows a structure 13, with which the outer race 15, of a bearing cooperates for support of a shaft (not shown), which extends through the axial aperture 17, of inner race 19. The inner race 19 is supported, for rotation relative to the outer race 15, by means of spheres 21, which ride in the raceways of the bearing races. The spheres 21, which may be rollers in a suitable bearing, are made of a resilient material such as rubber or plastic—for example Marblette 186—which deflects under load without permanent deformation. The deflection capability may be either a characteristic of the material or the design configuration.

The spheres can therefore be manufactured to within rather large tolerance limits, and they may be molded or cast by any convenient process with no required machining or finishing. During normal operation of the bearing, the larger spheres are slightly compressed to the diameter of the smaller spheres until the load is equally distributed on all the rolling members. The minimal compression exerted does not measurably increase the rolling resistance of the bearing assembly.

According to the preferred embodiment depicted in the figure, mounted between the bearing races and between the inner race 19 and the structure 13 are suitably shaped and dimensioned pieces of Teflon or other material 23 which prevent complete metal to metal contact of the bearing during overload, and serve as seals against intrusion of foreign matter. These pieces of material, shown to indicate only examples of positions in which they may be used, are suitably mounted on one race or the other and a very small aperture, on the order of a few thousandths of an inch, is left between the material and the opposing race or structure. Thus, water, oil and dirt cannot enter through the gaps A and B between inner race 19 and outer race 15 and get into the raceways to foul the bearing.

A sudden or shock load applied now to the bearing will compress the resilient rolling members in proportion to the applied load. As long as this is lower than the limits of the elastic deformation of the rolling members, no brinelling will occur. Thus, a limitation of the displacements of the races of the bearing is required. This is accomplished by limiting gaps A and B to less than the maximum amount of compressibility of the rolling members. The limitation of the compression is accomplished by near metal to metal contact of the races or inner race and the structure, separated only by the small sealing material. Excess shock load is therefore transferred directly to the supporting structure, in which the bearing is used. Since a shock load is applied only for a fraction of a second, the relatively slow rotation of the bearing is unimpaired. The load also, when applied to the bearing, causes the bearing to change from a rolling bearing to a sliding bearing. If material 23 is Teflon or other suitable self lubricating material, then the races of the bearing will slide relative to one another at approximately the same relative speed as when in a rolling relationship.

The material 23 may form part i.e. be attached to either inner race 19 or outer race 15 or for that matter may consist of a washer type structure which is mounted within the gaps A and B. As noted above, no matter where the material 23 is secured its orientation preferably is such that under normal load when the major portion thereof is being carried by the roller bearings the aperture between the material 23 and the surface of one or both races does not exceed a few thousandths of an inch, and should if possible achieve the closest orientation possible without actual contact with the opposing race surface. This arrangement to a large extent elimiantes the entrance of dirt, oil, grease and other foreign matter which may foul the bearing under normal or exceptionally hot or cold operating conditions. The only critical limitations which can be placed on the material at 23 are that the material must be substantially incompressible, possess a low coefficient of friction to permit relative ease in sliding, and be capable of useful operation under the conditions peculiar to the bearing use.

Wherein we claim:
1. A bearing comprising an inner annular metal race, and an outer annular metal race, mating raceways in said inner and outer races, rolling members in said raceways, said rolling members all being of resilient plastic material, a gap between said inner and outer races, said gap being smaller than the amount said rolling members will deform without permanent deformation, a self lubricating plastic material in said gap and attached to one of said races and occupying most of the width of said gap and oriented such that upon application of a shock load to said bearing, both of said races will contact said self lubricating material and continue in relative rotation.

2. The bearing of claim 1 wherein self lubricating material is secured to said inner race and under conditions of normal load extends across said gap leaving an aperture of at most a few thousandths of an inch between said self lubricating material and said outer race.

3. The bearing of claim 2 wherein said self lubricating material is Teflon.

4. The bearing of claim 1 wherein said self lubricating material is secured to said outer race and under conditions of normal load extends across said gap leaving an aperture of at most a few thousandths of an inch between said self lubricating material and said inner race.

5. The bearing of claim 4 wherein said self lubricating material is Teflon.

References Cited

UNITED STATES PATENTS

| | | | |
|---|---|---|---|
| 1,961,134 | 6/1934 | Buckwalter | 308—35 X |
| 2,871,562 | 2/1959 | Kern | 32—27 |
| 3,089,221 | 5/1963 | Barr | 29—148.4 |
| 3,301,611 | 1/1967 | Dunlap | 308—35 X |

MARTIN P. SCHWADRON, *Primary Examiner.*

F. SUSKO, *Assistant Examiner.*